(12) United States Patent
Zhai et al.

(10) Patent No.: US 12,062,966 B2
(45) Date of Patent: Aug. 13, 2024

(54) CONDUCTION-COOLED MAGNETIC FLUX PUMP

(71) Applicant: Hunan University, Changsha (CN)

(72) Inventors: Yujia Zhai, Changsha (CN); Chang Niu, Changsha (CN); Chunran Mu, Changsha (CN); Tingkun Weng, Changsha (CN); Jian Gao, Changsha (CN); Shoudao Huang, Changsha (CN)

(73) Assignee: Hunan University, Changsha (CN)

( * ) Notice: Subject to any disclaimer, the term of this patent is extended or adjusted under 35 U.S.C. 154(b) by 243 days.

(21) Appl. No.: 17/820,828

(22) Filed: Aug. 18, 2022

(65) Prior Publication Data
US 2023/0231461 A1    Jul. 20, 2023

(30) Foreign Application Priority Data
Jan. 19, 2022    (CN) .......................... 202210061652.0

(51) Int. Cl.
| | |
|---|---|
| *H01F 6/00* | (2006.01) |
| *H02K 1/27* | (2022.01) |
| *H02K 3/02* | (2006.01) |
| *H02K 7/00* | (2006.01) |
| *H02K 9/19* | (2006.01) |
| *H02K 55/00* | (2006.01) |

(52) U.S. Cl.
CPC ............... *H02K 55/00* (2013.01); *H02K 1/27* (2013.01); *H02K 3/02* (2013.01); *H02K 7/003* (2013.01); *H02K 9/19* (2013.01)

(58) Field of Classification Search
CPC ........................................ H01F 6/005–6/006
See application file for complete search history.

(56) References Cited

FOREIGN PATENT DOCUMENTS

CN            112098911 A    * 12/2020

* cited by examiner

*Primary Examiner* — Ramon M Barrera
(74) *Attorney, Agent, or Firm* — NIELDS, LEMACK & FRAME, LLC

(57) ABSTRACT

Disclosed is a conduction-cooled magnetic flux pump, comprising a refrigerator, a cooling capacity conducting part, a cooling capacity conducting plate, a high-temperature superconducting coil, a high-temperature superconducting tape, an L-shaped machined part, a dynamic sealing device, a motor, a rotating shaft, a bow-shaped epoxy resin machined part, a permanent magnet rotor disk, and a permanent magnet. The cooling capacity conducting plate is connected to the refrigerator, the high-temperature superconducting coil is installed on the cooling capacity conducting plate, the high-temperature superconducting tape is fixed to the cooling capacity conducting plate by the L-shaped machined part. An output end of the motor is connected to one end of the rotating shaft through the dynamic sealing device, the other end of the rotating shaft is rotationally connected to the bow-shaped epoxy resin machined part. The permanent magnet rotor disk is installed on the rotating shaft and rotates along with the rotating shaft.

10 Claims, 2 Drawing Sheets

CONDUCTION-COOLED MAGNETIC FLUX PUMP

CROSS REFERENCE TO RELATED APPLICATION

This patent application claims the benefit and priority of Chinese Patent Application No. 202210061652.0, filed on Jan. 19, 2022, the disclosure of which is incorporated by reference herein in its entirety as part of the present application.

TECHNICAL FIELD

The present disclosure relates to the technical field of high-temperature superconducting magnet, and in particular relates to a conduction-cooled magnetic flux pump.

BACKGROUND ART

There are two main ways to magnetize superconducting magnets at present: a power supply direct driving mode and a magnetic flux pump induced excitation mode. The current lead used in the power supply direct drive method is bridged between room temperature and low temperature environments, and the large temperature gradient causes the current lead to form a source of heat leakage. The lead itself also generates Joule heat to form an additional heat source when energized and excited. The source of heat leakage and additional heat source are extremely detrimental to the low temperature maintenance of superconducting magnets, especially for high-current superconducting magnets, where the lead is particularly high in heat loss power and large in cooling load. In addition, the AC component voltage from the commercial DC supply voltage ripple may emit a certain amount of heat that affects the closed-loop operation of the superconducting magnets, which in turn causes uneven and unstable magnetic fields.

The main magnetic flux pump technologies based on radio energy transmission are a rotating permanent magnet type magnetic flux pump, a linear motor type magnetic flux pump, and a transformer-rectifier type magnetic flux pump. The linear motor type magnetic flux pump and the transformer-rectifier type magnetic flux pump both are provided with tightly wound winding wires and multiple layers of laminated silicon steel sheets. Such structure may enable the magnetic flux pump itself to have a certain Joule heat loss and iron loss. In addition, the above types of high-temperature superconducting magnetic flux pumps above all need to operate in a liquid nitrogen/helium soaking environment, but the liquid nitrogen/helium itself is high in cost and rapid in volatilization, and cannot be supplemented in time during the transportation of the magnets.

SUMMARY

A conduction-cooled magnetic flux pump is disclosed, which solves the problem of dependency on the liquid nitrogen/helium during the operation of a high-temperature superconducting magnetic flux pump, and is free of complexity of the complexity of recycling liquid nitrogen/helium. The problems of insulation and cooling capacity conduction of the conduction-cooled magnetic flux pump in a low-temperature vacuum environment are solved, the stability of the magnetic flux pump is greatly improved, the operating loss of the system is reduced, and the output current and the excitation efficiency of the magnetic flux pump are improved, such that the technical problem involved in the background art may be effectively solved.

To achieve the objective above, the present disclosure employs the technical solutions as follows:

A conduction-cooled magnetic flux pump, comprising a refrigerator, a cooling capacity conducting part, a cooling capacity conducting plate, a high-temperature superconducting coil, a high-temperature superconducting tape, an L-shaped machined part, a dynamic sealing device, a motor, a rotating shaft, a bow-shaped epoxy resin machined part, a permanent magnet rotor disk, and a permanent magnet. The refrigerator comprises a first-stage cold head, the cooling capacity conducting part is connected to the first-stage cold head, the cooling capacity conducting plate is connected to the cooling capacity conducting part, the high-temperature superconducting coil is installed on the cooling capacity conducting plate, and the high-temperature superconducting tape is fixed to the cooling capacity conducting plate by the L-shaped machined part and is provided at a certain distance from the permanent magnet rotor disk. A room temperature side shaft and a vacuum side shaft which are connected are arranged in the dynamic sealing device. An output end of the motor is connected to the room temperature side shaft, one end of the rotating shaft is connected to the vacuum side shaft, and the other end of the rotating shaft is rotationally connected to the bow-shaped epoxy resin machined part. The permanent magnet rotor disk is installed on the rotating shaft and rotates along with the rotating shaft, and the permanent magnet is embedded into the permanent magnet rotor disk.

As a preferred improvement of the present disclosure, the cooling capacity conducting part is a copper cooling capacity conducting part.

As a preferred improvement of the present disclosure, the cooling capacity conducting plate is an oxygen-free copper plate.

As a preferred improvement of the present disclosure, the high-temperature superconducting coil is a high-temperature double-pancake superconducting coil.

As a preferred improvement of the present disclosure, the high-temperature superconducting tape is SC1270420-7YBCO tape.

As a preferred improvement of the present disclosure, the output end of the motor is connected to the room temperature side shaft by a plum coupling, and the rotating shaft is connected to the vacuum side shaft by a plum coupling.

As a preferred improvement of the present disclosure, the rotating shaft comprises a glass fiber shaft having one end connected to the vacuum side shaft by the plum coupling, and a stainless steel shaft having one end connected to the other end of the glass fiber shaft by the plum coupling; the other end of the stainless steel shaft is rotationally connected to the bow-shaped epoxy resin machined part by a bearing, and the permanent magnet rotor disk is fixedly arranged on the stainless steel shaft.

As a preferred improvement of the present disclosure, the magnetic flux pump further comprises a slotted epoxy resin machined part, one end of the slotted epoxy resin machined part is fixed to the bow-shaped epoxy resin machined part, and the other end of the slotted epoxy resin machined part is in fit connection with the rotating shaft.

As a preferred improvement of the present disclosure, three permanent magnet rotor disks made of made of a glass fiber material are provided, and the three permanent magnet rotor disks are installed on the rotating shaft at equal intervals and in staggered phases.

As a preferred improvement of the present disclosure, a plurality of permanent magnets, which are circular SmCo permanent magnets, are provided; the plurality of permanent magnets are radially embedded into the permanent magnet rotor disk, and the magnetic poles at the ends, facing the center of the circle of the permanent magnet rotor disk, of the permanent magnets have the same polarity.

The present disclosure has the beneficial effects as follows:

1. A low-temperature environment is provided by providing the refrigerator, which avoids the recycling of the liquid nitrogen/helium, and is conducive to the transportation maintenance and long-term safe and stable operation of the magnetic flux pump.
2. The permanent magnet rotor disk is made of a glass fiber material, which greatly reduces the radiation heat leakage during the rotation of a rotor portion of the magnetic flux pump.
3. The excitation rate and the saturation current of the magnetic flux pump may be effectively increased under the same rotational speed by providing three permanent magnet rotor disks.
4. The used SmCo permanent magnet has high temperature stability, which may guarantee the amplitude of a traveling wave magnetic field at an ultra-low temperature environment.
5. By providing the dynamic sealing device, the motor and a drive lead are isolated from the Dewar to ensure the minimum thermal load of the magnetic flux pump.
6. By employing a three-stage cooling capacity conduction structure, the stator portion and the load coil of the magnetic flux pump are guaranteed to operate in the same temperature zone.
7. By providing the bow-shaped epoxy resin machined part and the slotted epoxy resin machined part, the mechanical disturbance caused by the rotation of shaft is eliminated while the perpendicularity of the rotor portion is ensured.
8. The frequency and a traveling direction of the traveling wave magnetic field may be controlled by controlling the rotational speed and a rotational direction of the motor, thus controlling the amplitude and frequency of the saturation current, and making the system more stable and controllable.
9. There is no Joule heat and no additional iron losses in the winding coils, and there is also no need for thermal excitation switches or current switches, resulting in less energy loss and lower operating cost.

BRIEF DESCRIPTION OF THE DRAWINGS

To describe the technical solutions in the embodiments of the present disclosure more clearly, the following briefly introduces the accompanying drawings required for describing the embodiments. Apparently, the accompanying drawings in the following description show merely some embodiments of the present disclosure, and those of ordinary skill in the art may still derive other drawings from these accompanying drawings without creative efforts.

DETAILED DESCRIPTION OF THE EMBODIMENTS

The following clearly and completely describes the technical solutions in the embodiments of the present disclosure with reference to the embodiments of the present disclosure. Apparently, the described embodiments are merely a part rather than all of the embodiments of the present disclosure. All other embodiments obtained by a person of ordinary skill in the art based on the embodiments of the present disclosure without creative efforts shall fall within the protection scope of the present disclosure.

It needs to be noted that all directional indications in the embodiments of the present disclosure (such as "upper", "lower", "left", "right", "front", "back") are only used to explain a relative positional relationship, and movement conditions between g various components under a certain attitude (as shown in the accompanying drawings), and if that particular attitude is changed, the directional indications change accordingly.

Furthermore, the descriptions relating to "first", "second" and the like are used for descriptive purposes only and are not to be construed as indicating or implying relative importance or implying the number of the indicated technical features. As such, the features limited to "first" and "second" may explicitly or implicitly include at least one of those features. In the description of the present disclosure, "a plurality of" means at least two, e.g., two, three, etc., unless expressly specified otherwise.

In the present disclosure, unless expressly specified and limited otherwise, the terms "connection", "fixation" and the like should be understood broadly, e.g., the "fixation" may be fixed connection or detachable connection; may be mechanical connection or electrical connection; may be direct connection or indirect connection via an intermediate medium; may be internal communication of two elements or an interaction relationship between the two elements, unless expressly defined otherwise. For those of ordinary skill in the art, the specific meanings of the above terms in the present disclosure can be understood on a case-by-case basis.

In addition, the technical solutions between the various embodiments of the present disclosure may be combined with each other, but only on the basis that they can be realized by those of ordinary skill in the art. When the combination of technical solutions appears to contradict each other or cannot be realized, it shall be considered that such combination of technical solutions does not exist and is also not within the scope of protection claimed by the present disclosure.

Figure 1:
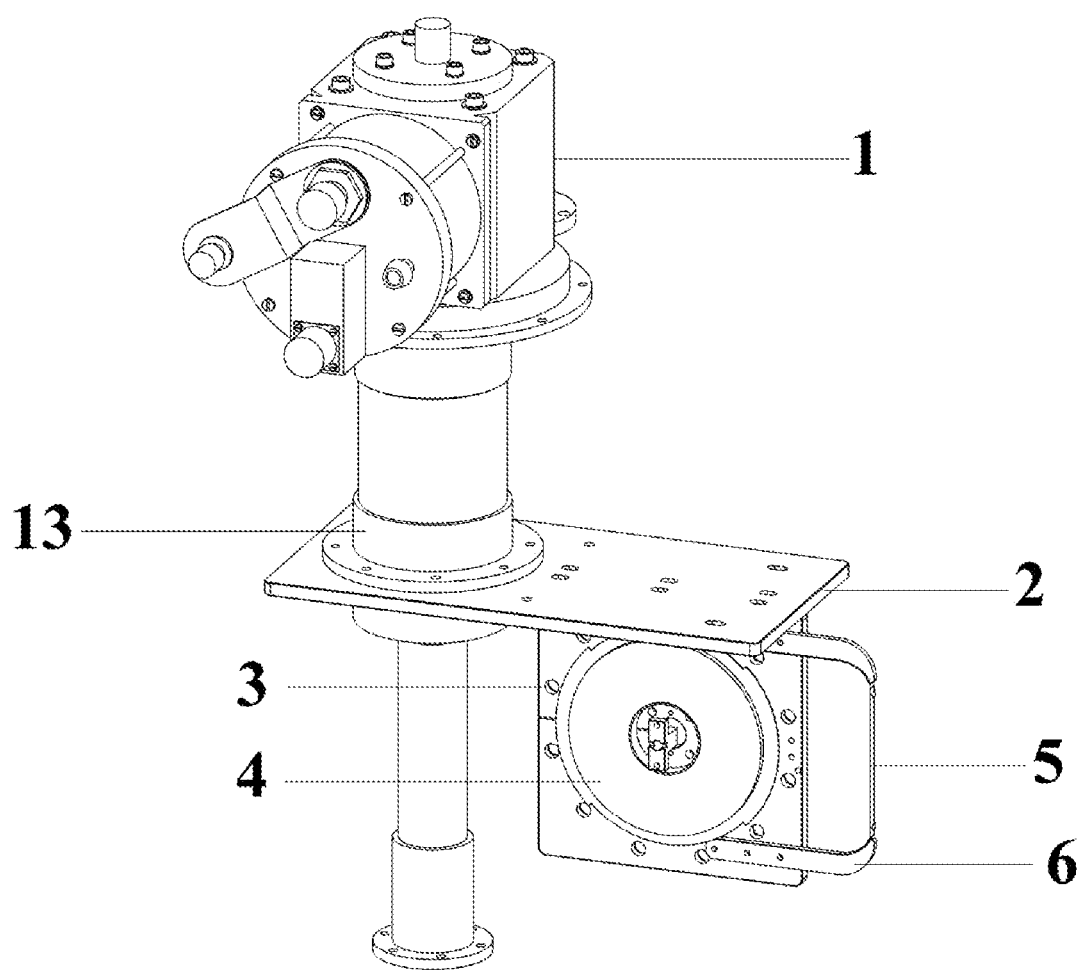
FIG. 1 is a structure diagram of a stator and a coil of a magnetic flux pump in accordance with the present disclosure.
Figure 2:
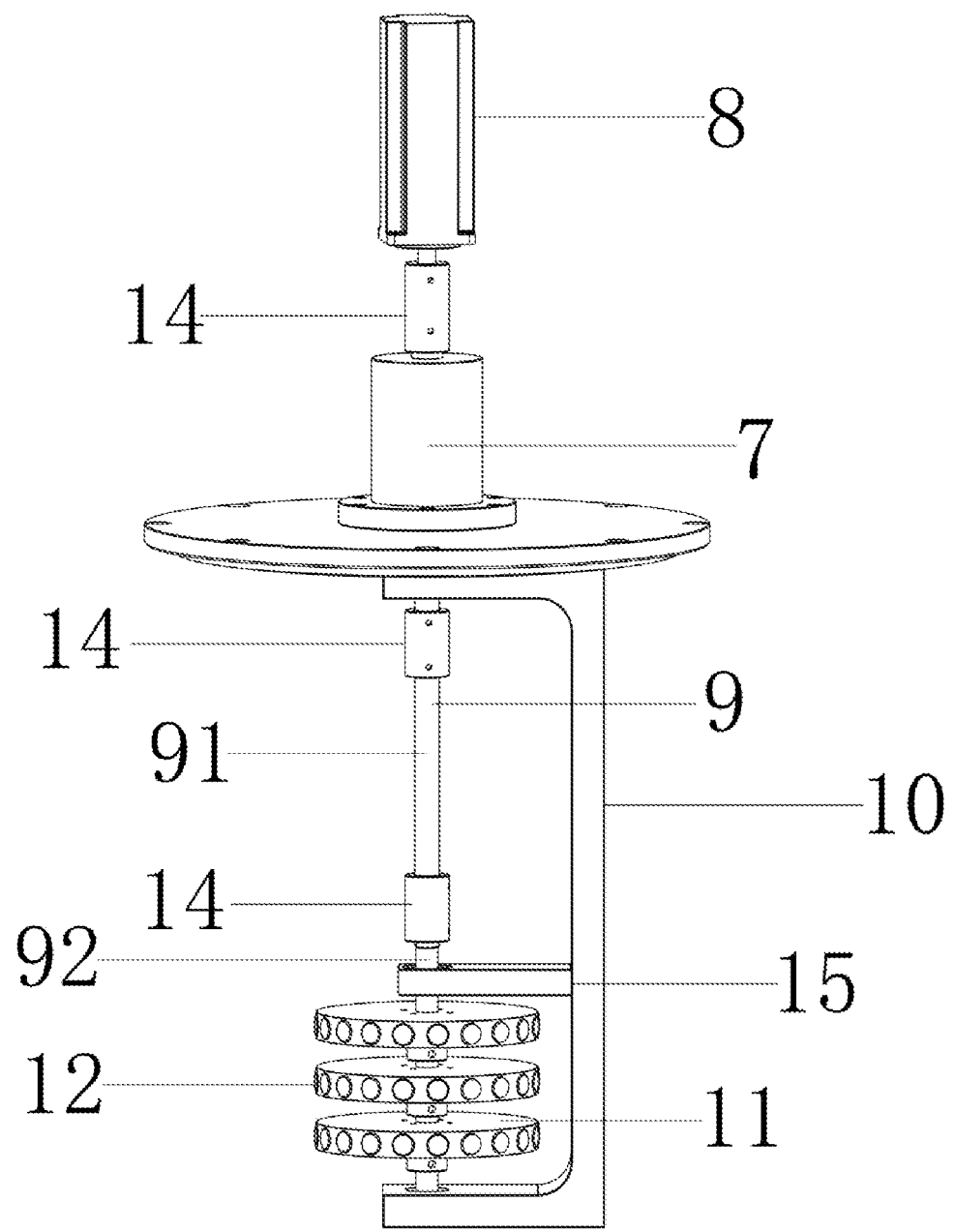
FIG. 2 is a structure diagram of a rotor and a rotational driving structure of a magnetic flux pump in accordance with the present disclosure.

Please refer to FIG. 1 and FIG. 2, a conduction-cooled magnetic flux pump comprises a refrigerator 1, a cooling capacity conducting part 2, cooling capacity conducting plates 3, a high-temperature superconducting coil 4, a high-temperature superconducting tape 5, L-shaped machined parts 6, a dynamic sealing device 7, a motor 8, a rotating shaft 9, a bow-shaped epoxy resin machined part 10, permanent magnet rotor disks 11, and permanent magnets 12. The refrigerator 1 is a G-M refrigerator, and comprises a first-stage cold head 13 having a cryogenic temperature of 40 K. The first-stage cold head 13 is used as the first stage for cooling capacity conduction and has a larger refrigerating capacity, through which the heat during the running of the magnetic flux pump may be effectively taken away in time, making the magnetic flux pump operate safely and stably for a long time. In addition, the recycling of liquid nitrogen/helium is avoided as the refrigerator 1 is used for providing the low-temperature environment, which is conducive to the transportation maintenance and long-term safe and stable operation of the magnetic flux pump.

The cooling capacity conducting part 2 is connected to the first-stage cold head 13. Specifically, the cooling capacity conducting part 2 is a rectangular copper cooling capacity conducting part, the cooling capacity generated by the refrigerator 1 is transferred, by the first cold head 13, to the cooling capacity conducting part 2 as a first-stage cooling capacity conduction of the magnetic flux pump, with an overall cooling capacity conduction area of about 4,255 mm$^2$.

The cooling capacity conducting plates 3 are connected to the cooling capacity conducting part 2. The cooling capacity conducting plates 3 are oxygen-free cooper plates, and each is provided with a groove for accommodating the high-temperature superconducting coil 4, and the high-temperature superconducting coil 4 is clamped by two cooling capacity conducting plate 3. The cooling capacity is transferred, by the cooling capacity conducting part 2, to the cooling capacity conducting plates 3 as a second stage cooling capacity conduction of the magnetic flux pump, with an overall cooling capacity conduction area of about 1,844 mm$^2$.

The high-temperature superconducting coil 4 is installed on the cooling capacity conducting plates 3. Specifically, the high-temperature superconducting coil 4 is a high-temperature double-pancake superconducting coil, which is formed by employing and winding a 4 mm YBCO coating conductor available from Superpower company and a stainless-steel band. The coil has an inner diameter of 43 mm, an outer diameter of 113 mm, and an overall inductance L equal to 27.3 mH. A lead of the high-temperature superconducting coil 4 and the high-temperature superconducting tape 5 are welded by a Sn63Pb37 solder having a melting point of 183 degrees Celsius, with a welding length of 2 cm. Welding points are attached to the upper and lower L-shaped machined parts 6 which are connected to cooling capacity conducting plates 3.

The high-temperature superconducting tape 5 is fixed to the cooling capacity conducting plates 3 by the L-shaped machined parts 6. Specifically, the high-temperature superconducting tap 5 is an SC1270420-7YBCO tape having a width of 10 mm, which is copper-plated and packaged and has a maximum bearable current of 480 A. The cooling capacity is transferred, by the cooling capacity conducting plates 3, to the L-shaped machined parts 6 as a third stage cooling capacity conduction of the magnetic flux pump, with an overall cooling capacity conduction area of 160.8 mm$^2$. The magnetic flux pump employs a three-stage cooling capacity conduction structure so as to ensure that a stator portion of the magnetic flux pump and a load coil operate in the same temperature zone.

A room temperature side shaft (not shown in figure) and a vacuum side shaft (not shown in figure) which are connected are arranged in the dynamic sealing device 7. The motor 8 is a 100 W servo motor having a highest rotational speed of 3000 rad/min, an output end of the motor is connected to the room temperature side shaft by a plum coupling 14, one end of the rotating shaft 9 is connected to the vacuum side shaft by a plum coupling 14, and the other end of the rotating shaft is rotationally connected to the bow-shaped epoxy resin machined part 10 by a bearing (not shown in figure).

The dynamic sealing device 7 employs a vacuum dynamic sealing technology to isolate the motor and a drive lead from the Dewar, thus ensuring the minimum thermal load of the magnetic flux pump.

The rotating shaft 9 comprises a glass fiber shaft 91 having one end connected to the vacuum side shaft by the plum coupling 14 and a stainless-steel shaft 92 having one end connected to the other end of the glass fiber shaft 91 by the plum coupling 14, and the other end of the stainless-steel shaft 92 is rotationally connected to the bow-shaped epoxy resin machined part 10 by the bearing. The permanent magnet rotor disks 11 are fixedly arranged on the stainless-steel shaft 92.

Specifically, the glass fiber shaft 91 has a diameter of 10 mm and a length of 120 mm. The stainless-steel shaft 92 has a diameter of 10 mm, and a length of 100 mm.

In order to guarantee the perpendicularity of the rotating shaft 9 and eliminate mechanical disturbance caused by rotation, the magnetic flux pump further comprises a slotted epoxy resin machined part 15. One end of the slotted epoxy resin machined part 15 is fixed to the bow-shaped epoxy resin machined part 10, and the other end of the slotted epoxy resin machined part is in fit connection with the rotating shaft 9.

The permanent magnet rotor disks 11 are installed on the rotating shaft 9 and rotate along with the rotating shaft 9. A distance between each permanent magnet rotor disk 11 and the high-temperature superconducting tape 5 at a stator portion of the magnetic flux pump is set to be 1 mm Specifically, the number of the permanent magnet rotor disks 11 which are made of a glass fiber material is three, the three permanent magnet rotor disks 11 are installed on the stainless steel shaft 92 at equal intervals and in staggered phases, and the three permanent magnet rotor disks 11 may effectively increase the excitation rate and saturation current of the magnetic flux pump under the same rotational speed.

The permanent magnets 12 are embedded into the permanent magnet rotor disks 11. Furthermore, the permanent magnets 12 are adhered and fixed into the permanent magnet rotor disks 11 by black epoxy glue, which is not only conducive to the fixation of the permanent magnets 12, but also beneficial to regulating the distance between a stator and a rotor of the magnetic flux pump.

Specifically, the permanent magnets 12 are circular SmCo permanent magnets having a surface magnetic field of 3,200 Gs, and a plurality of permanent magnets 12 is multiple. The plurality of permanent magnets 12 are radially embedded into the permanent magnet rotor disk 11, and the magnetic poles at the ends, facing the center of the permanent magnet rotor disks 11, of the permanent magnets have the same polarity. Specifically, each permanent magnet rotor disk 11 has an inner diameter of 10 mm and an outer diameter of 110 mm, and the outer surfaces are all built with 20 cylindrical grooves, and each cylindrical groove is centered 17.27 mm apart. The permanent magnets 12 are installed in the cylindrical grooves. The permanent magnet made of the SmCo material has high temperature stability, which may guarantee the amplitude of a traveling wave magnetic field in an ultra-low temperature environment, and the embedded structure is also convenient for adjusting the distance between the stator and rotor of the magnetic flux pump.

The present disclosure has the beneficial effects as follows:

1. A low-temperature environment is provided by providing the refrigerator, which avoids the recycling of the liquid nitrogen/helium, and is conducive to the transportation maintenance and long-term safe and stable operation of the magnetic flux pump.
2. The permanent magnet rotor disk is made of a glass fiber material, which greatly reduces the radiation heat leakage during the rotation of a rotor portion of the magnetic flux pump.
3. The excitation rate and the saturation current of the magnetic flux pump may be effectively increased under the same rotational speed by providing three permanent magnet rotor disks.
4. The used SmCo permanent magnet has high temperature stability, which may guarantee the amplitude of a traveling wave magnetic field at an ultra-low temperature environment.
5. By providing the dynamic sealing device, the motor and the drive lead are isolated from the Dewar to ensure the minimum thermal load of the magnetic flux pump.
6. By employing a three-stage cooling capacity conduction structure, the stator portion and the load coil of the magnetic flux pump are guaranteed to operate in the same temperature zone.
7. By providing the bow-shaped epoxy resin machined part and the slotted epoxy resin machined part, the mechanical disturbance caused by the rotation of shaft is eliminated while the perpendicularity of the rotor portion is ensured.
8. The frequency and a traveling direction of the traveling wave magnetic field may be controlled by controlling the rotational speed and a rotational direction of the motor, thus controlling the amplitude and frequency of the saturation current, and making the system more stable and controllable.
9. There is no Joule heat and no additional iron losses in the winding coils, and there is also no need for thermal excitation switches or current switches, resulting in less energy loss and lower operating cost.

Although the embodiments of the present disclosure have been disclosed as above, they are not limited to only the applications set forth in the specification and embodiments, but can absolutely be applicable to a variety of fields suitable for the present disclosure. Additional modifications can be easily implemented for those skilled in the art, such that the present disclosure is not limited to particular details and the illustrated and described drawings herein without departing from the general concepts defined by the claims and equivalent scope.

What is claimed is:

1. A conduction-cooled magnetic flux pump, comprising a refrigerator, a cooling capacity conducting part, a cooling capacity conducting plate, a high-temperature superconducting coil, a high-temperature superconducting tape, an L-shaped machined part, a dynamic sealing device, a motor, a rotating shaft, a bow-shaped epoxy resin machined part, permanent magnet rotor disks, and permanent magnets, wherein the refrigerator comprises a first-stage cold head, the cooling capacity conducting part being connected to the first-stage cold head, the cooling capacity conducting plate being connected to the cooling capacity conducting part, the high-temperature superconducting coil being installed on the cooling capacity conducting plate, and the high-temperature superconducting tape being fixed to the cooling capacity conducting plate by the L-shaped machined part and provided at a certain distance from the permanent magnet rotor disks; a room temperature side shaft and a vacuum side shaft, which are connected and arranged in the dynamic sealing device, an output end of the motor being connected to the room temperature side shaft, one end of the rotating shaft being connected to the vacuum side shaft, and the other end of the rotating shaft being rotationally connected to the bow-shaped epoxy resin machined part; wherein the permanent magnet rotor disk is installed on the rotating shaft and rotates along with the rotating shaft, and the permanent magnets are embedded into the permanent magnet rotor disks.

2. The conduction-cooled magnetic flux pump according to claim 1, wherein the cooling capacity conducting part is a copper cooling capacity conducting part.

3. The conduction-cooled magnetic flux pump according to claim 1, wherein the cooling capacity conducting plate is an oxygen-free copper plate.

4. The conduction-cooled magnetic flux pump according to claim 1, wherein the high-temperature superconducting coil is a high-temperature double-pancake superconducting coil.

5. The conduction-cooled magnetic flux pump according to claim 1, wherein the high-temperature superconducting tape is SC1270420-7YBCO tape.

6. The conduction-cooled magnetic flux pump according to claim 1, wherein the output end of the motor is connected to the room temperature side shaft by a plum coupling, and the rotating shaft is connected to the vacuum side shaft by a plum coupling.

7. The conduction-cooled magnetic flux pump according to claim 1, wherein the rotating shaft comprises a glass fiber shaft having one end connected to the vacuum side shaft by a plum coupling, and a stainless steel shaft having one end connected to the other end of the glass fiber shaft by a plum coupling; the other end of the stainless steel shaft is rotationally connected to the bow-shaped epoxy resin machined part by a bearing, and the permanent magnet rotor disk is fixedly arranged on the stainless steel shaft.

8. The conduction-cooled magnetic flux pump according to claim 1, further comprising a slotted epoxy resin machined part, wherein one end of the slotted epoxy resin machined part is fixed to the bow-shaped epoxy resin machined part, and the other end of the slotted epoxy resin machined part is in fit connection with the rotating shaft.

9. The conduction-cooled magnetic flux pump according to claim 1, wherein the number of permanent magnet rotor disks, which are made of a glass fiber material, is three, and the three permanent magnet rotor disks are installed on the rotating shaft at equal intervals and in staggered phases.

10. The conduction-cooled magnetic flux pump according to claim 1, wherein the permanent magnets are circular SmCo permanent magnets, and a plurality of permanent magnets are provided; the plurality of permanent magnets are radially embedded into the permanent magnet rotor disk, and the magnetic poles at the ends, facing the center of the circle of the permanent magnet rotor disk, of the permanent magnets have the same polarity.

* * * * *